US008650261B2

(12) United States Patent
Zimmer

(10) Patent No.: US 8,650,261 B2
(45) Date of Patent: Feb. 11, 2014

(54) SYSTEM AND METHOD FOR UPDATING SOFTWARE USING UPDATED DATA FROM EXTERNAL SOURCES

(75) Inventor: Mark Zimmer, Katy, TX (US)

(73) Assignee: Siemens Energy, Inc., Orlando, FL (US)

( * ) Notice: Subject to any disclaimer, the term of this patent is extended or adjusted under 35 U.S.C. 154(b) by 1259 days.

(21) Appl. No.: 12/254,100

(22) Filed: Oct. 20, 2008

(65) Prior Publication Data

US 2009/0113409 A1     Apr. 30, 2009

Related U.S. Application Data

(60) Provisional application No. 60/982,165, filed on Oct. 24, 2007.

(51) Int. Cl.
*G06F 15/16*     (2006.01)
(52) U.S. Cl.
USPC .......................................................... 709/217
(58) Field of Classification Search
USPC ........... 709/217–219, 201–203; 717/168–177
See application file for complete search history.

(56) References Cited

U.S. PATENT DOCUMENTS

| 7,913,247 B2 * | 3/2011 | Diederichs .................... 717/173 |
| 2003/0046676 A1 * | 3/2003 | Cheng et al. .................. 717/173 |
| 2004/0088695 A1 * | 5/2004 | Kawano et al. ............... 717/171 |
| 2007/0078637 A1 * | 4/2007 | Martin et al. .................... 703/6 |
| 2008/0189702 A1 * | 8/2008 | Morgan et al. ................ 718/100 |

FOREIGN PATENT DOCUMENTS

FR     2886430 A1     12/2006

OTHER PUBLICATIONS

Wikipedia: "Aggregator"; [Online] Oct. 23, 2007; pp. 1-3; XP002510621; www.wikipedia.org; Retrieved from the Inernet: URL:http://en.wikipedia.org/w/index.php?title-Aggregator &oldid=166580997> [retrieved on Jan. 16, 2009].
Wikipedia: "RSS"; [Online] Oct. 22, 2007; pp. 1-8; XP002510622; www.wikipedia.org; Retrieved from the Inernet: URL:http://en.wikipedia.org/w/index.php?title-RSS&oldid=166377003> [retrieved on Jan. 16, 2009].

* cited by examiner

*Primary Examiner* — Chirag R Patel

(57) ABSTRACT

A system and method for automatically updating reference values includes a processing device configured to execute a software application. The software application employs one or more dynamic data items which change as a function of time. A memory device is configured to store at least one table including the one or more dynamic data items which change as a function of time. An update mechanism is configured to check one or more external information sources for current values of the one or more dynamic data items and update the one or more dynamic data items in the at least one table such that upon execution of the software application a most recently updated value is employed for the one or more dynamic data items.

15 Claims, 3 Drawing Sheets

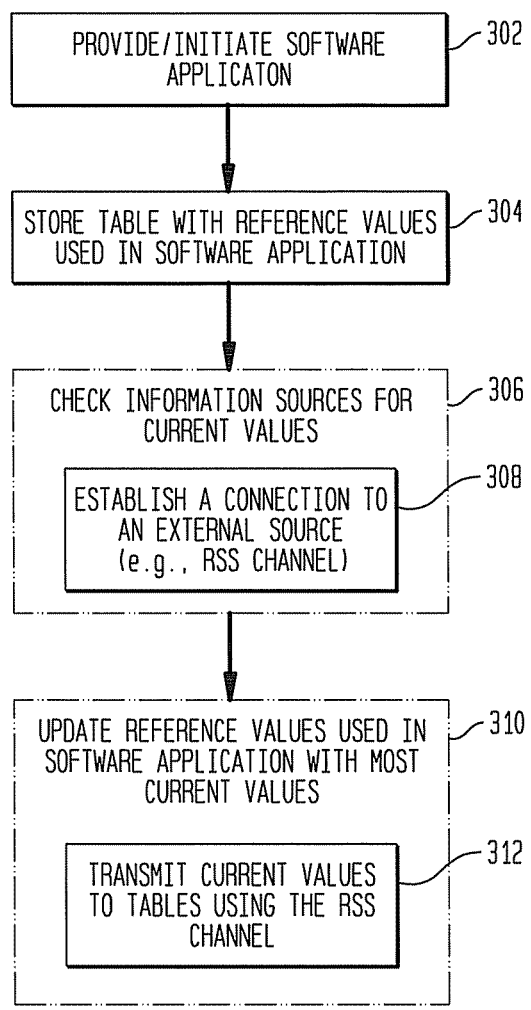

SYSTEM AND METHOD FOR UPDATING SOFTWARE USING UPDATED DATA FROM EXTERNAL SOURCES

RELATED APPLICATION INFORMATION

This application claims priority to provisional application Ser. No. 60/982,165 filed on Oct. 24, 2007, incorporated herein by reference.

BACKGROUND

1. Technical Field

This disclosure relates to software updating, and more particularly, to systems and methods for updating software data automatically to provide the best and most current results in estimation projections, and, in particular, for providing size and cost estimates under current market conditions for gas and oil applications.

2. Description of the Related Art

Planning budgets for construction projects, maintenance operations, doing business etc. is an import ant task, especially when available money is limited. Accurate predictions of costs for materials, fuel, labor, currency exchange rates, market prices and availability are all necessary considerations. These considerations are especially true in the oil and gas production industries.

Oil and gas facilities are evolving rapidly to meet increased energy demands. The construction of new pipelines, storage tanks, refineries, etc. depends on many factors. These factors change rapidly over time with market or other fluctuations. Up-to-date and even real-time data is needed to make decisions on whether production facilities are cost effective.

It is important to be able to estimate costs and sizes of production against need. Since many factors are involved in this type of decision making, software applications have been employed. To ensure profitability, pricing/cost data should be made immediately available to these software programs. However, in current systems, the pricing/cost data is updated by sending out quarterly software updates via compact disk (CD) or on other storage media. Given the rapidly changing conditions in the energy market, this time lag may result in inefficient or erroneous estimates.

SUMMARY OF THE INVENTION

A system and method for automatically updating reference values includes a processing device configured to execute a software application. The software application employs one or more dynamic data items which change as a function of time. A memory device is configured to store at least one table including the one or more dynamic data items which change as a function of time. An update mechanism is configured to check one or more external information sources for current values of the one or more dynamic data items and update the one or more dynamic data items in the at least one table such that upon execution of the software application a most recently updated value is employed for the one or more dynamic data items.

A method for automatically updating reference values includes providing a software application employing one or more dynamic data items which change as a function of time and storing at least one table including the one or more dynamic data items which change as a function of time. One or more external information sources are checked for current values of the one or more dynamic data items. The one or more dynamic data items are updated in the at least one table such that upon execution of the software application a most recently updated value is employed for the one or more dynamic data items.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 3 is a flow diagram showing a method for automatically updating reference values for use with a software program in accordance with the present invention.

DETAILED DESCRIPTION OF PREFERRED EMBODIMENTS

Figure 1:
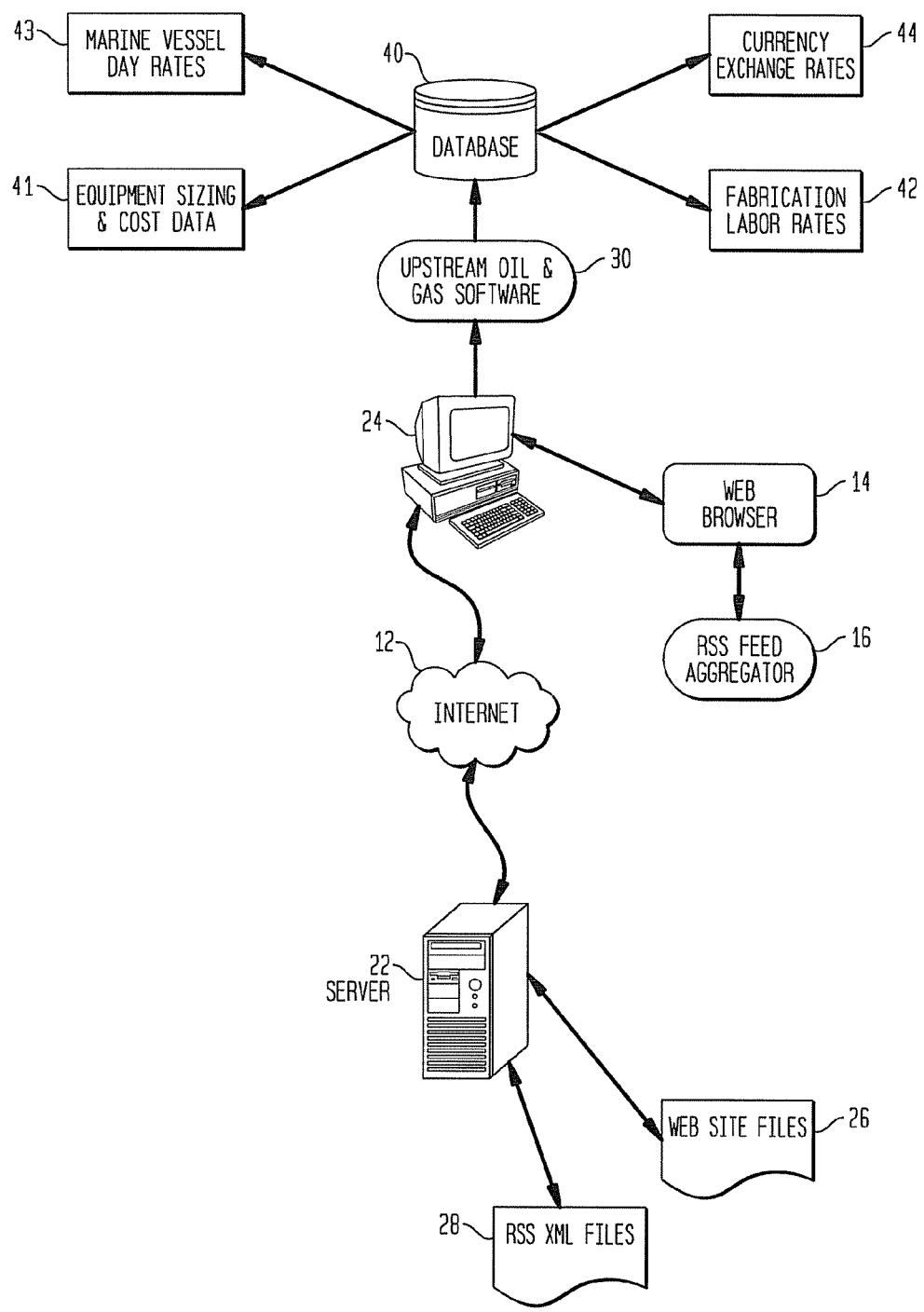
FIG. 1 is a block/flow diagram showing a system/method for providing current data for use with a software program in accordance with the present invention.

The present invention provides a system and method for updating software using current and up-to-date data, such as rate data, conversion data or the like. The system and method preferably include automatically updated information that may be updated after a predetermined lapse of time or may be updated in real-time as triggered by updated data from a remote location (e.g., changes in a market rate or price from a commodities market, a companies labor rate post, etc.).

It is to be understood that while the present invention will be described in terms of oil and gas software and related applications that the present invention is not limited to the illustrative example and may be employed with other systems where estimates or predictions would benefit from current and immediately updated data.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring now to the drawings in which like numerals represent the same or similar elements and initially to FIG. 1, a block/flow diagram is shown depicting a system/method 10 for cost estimation for a production facility in accordance with an illustrative embodiment. Although embodiments disclosed herein may be used in various environments, the embodiment related to cost estimation focuses on the updating of a database 40 for an upstream oil and gas facility cost estimating software tool 30. The upstream oil and gas software program 30 generates sizing and cost estimates for installation and operation of facilities needed for basic processing and transmission of oil and gas well streams. These streams preferably include pipelines; however, these streams may include other features as well such as transportation streams by truck, train, ship or other mode of transportation. The upstream oil and gas software program 30 utilizes the database 40 to perform its estimations. Database 40 includes tables of information that are used in conjunction with sizing and cost algorithms to determine a total cost to install and operate upstream oil and gas processing and transmission facilities. The database 40 includes, among other things, equipment sizing and cost data tables 41, fabrication labor rate data tables 42, marine vessel day rate data tables 43, currency exchange rate data tables 44, etc. These data tables need regular updates to keep the sizing and cost estimates generated by the algorithms in the upstream oil and gas software program 30 accurate within a current market.

The present invention comprises a way of automatically updating the data tables in database 40 to keep facility sizing and cost estimates current. In one embodiment, as a way of updating data, an RSS channel is created to permit the broadcast of updated data for any one of the upstream oil and gas software database tables. RSS stands for "really simple syndications", "Rich Site Summary" or "RDF (Resource Description Framework) Site Summary". RSS provides a way for the distribution of data for various applications.

RSS is a web feed format(s) used to publish frequently updated information, such as blog entries, news headlines, audio, video, etc., in a standardized format. An RSS document (which is called a "feed" or "channel") includes full or summarized text, plus metadata such as publishing dates and authorship. Web feeds benefit publishers by letting the feeds syndicate content quickly and automatically. The feeds benefit readers who want to subscribe to timely updates from favored websites or to aggregate feeds from many sites into one place, such as a table or tables in the database 40.

RSS feeds can be read using software such as an RSS reader, a feed reader, or an aggregator 16. The software can be web-based or desktop-based. A standardized XML file format permits the information to be published once and viewed by many different programs. A user device 24, such as a computer workstation, or computer-like device subscribes to a feed by entering the feed's link into the reader or by clicking an RSS icon in a browser 14 that initiates the subscription process. The RSS reader checks the user's subscribed feeds regularly for new work, downloads any updates that it finds, and provides a user interface to monitor and read the feeds.

RSS formats are preferably specified using XML, a generic specification for the creation of data formats. The RSS format is preferable for delivering regularly changing web content. Feed readers or aggregator software 16 permit a user to receive RSS feeds from various sites and display them or store them in the tables 41-44.

In accordance with one embodiment, sizing and cost data are transmitted from online website services over a network 12, such as the internet. Online website services may be provided using a server 22, web site files 26 and RSS XML files 28. The website services include data analogous to data included in the database tables, e.g., tables 41-44. The user subscribes to a feed by entering the feed's link into the reader or by clicking an RSS icon in the browser 14 that initiates the subscription process. The reader checks the user's subscribed feeds regularly for new content, downloading any updates that it finds. It is preferable that this update process is completely automated and transparent to the user of the product.

In one embodiment, the database 40 is updated after being alerted by a website or other external information source. When the site is updated, it triggers an alert to the user application that current data is available. The data can then be updated automatically or an update command may be issued from the workstation 24 to gather the updated information using an RSS channel or other update mechanism.

In another embodiment, the aggregator 16 inquires whether new data is available. If such data is available, an RSS channel is established which downloads to the workstation 24 the most current and up-to-date data for all or any one of the tables 41-44 in database 40. In one embodiment, the RSS feed comprises a list of items available for downloading.

The upstream oil and gas software 30 preferably has access to the internet via the web browser 14 installed on the workstation 24. The workstation 24 communicates to web site files 26 included on a host server 22. Cyclical inquires can be established such that at predetermined time intervals workstation 24 accesses the RSS feed website 26 to determine whether the most current data is available. In the event that a new update is available, the workstation 24 queries for a download. RSS XML files 28 including all the related updates for the oil and gas software database tables are then transmitted from the server 22 to the workstation 24 and upstream oil and gas software 30 will organize and store the data in the appropriate database tables 41-44.

In this manner, an automated update using a RSS format is conducted without the need for user or developer intervention and the costs associated with regular program updates for new pricing are eliminated. For example, an oil and gas distribution facility needs to be sized and costs thereof need to be estimated. A designer or construction contractor employs an upstream oil and gas software application (30) to make such projections. Since the RSS feed aggregator 16 is constantly looking for updates for related cost and engineering data, this data is downloaded on a regular basis such that the design/contractor is sure to have the latest data. The RSS format can be employed to get, e.g.: the latest material costs, the latest commodity costs, the latest shipping rates, the latest product availability, account balances, labor rates, etc. The software 30 is configured to look to the database 40 for constants, rates and coefficients used to estimate costs or to perform any program application tasks. The database 40 is maintained in an up-to-date condition using, e.g., the RSS format technology. In this way, a new estimate can be generated at anytime based on the most current information.

In another useful aspect, a cost estimate for an oil refinery is needed where a break-even point needs to be determined to find out whether the refinery is feasible from a cost perspective. The application (30) needs current material costs and current market valuations of gas and oil. If an estimate is provided on day "one", a new estimate may be generated with little of no effort on, e.g., day "twenty" with the most current data. Such reevaluation is almost effortless in accordance with the present principles.

Figure 2:
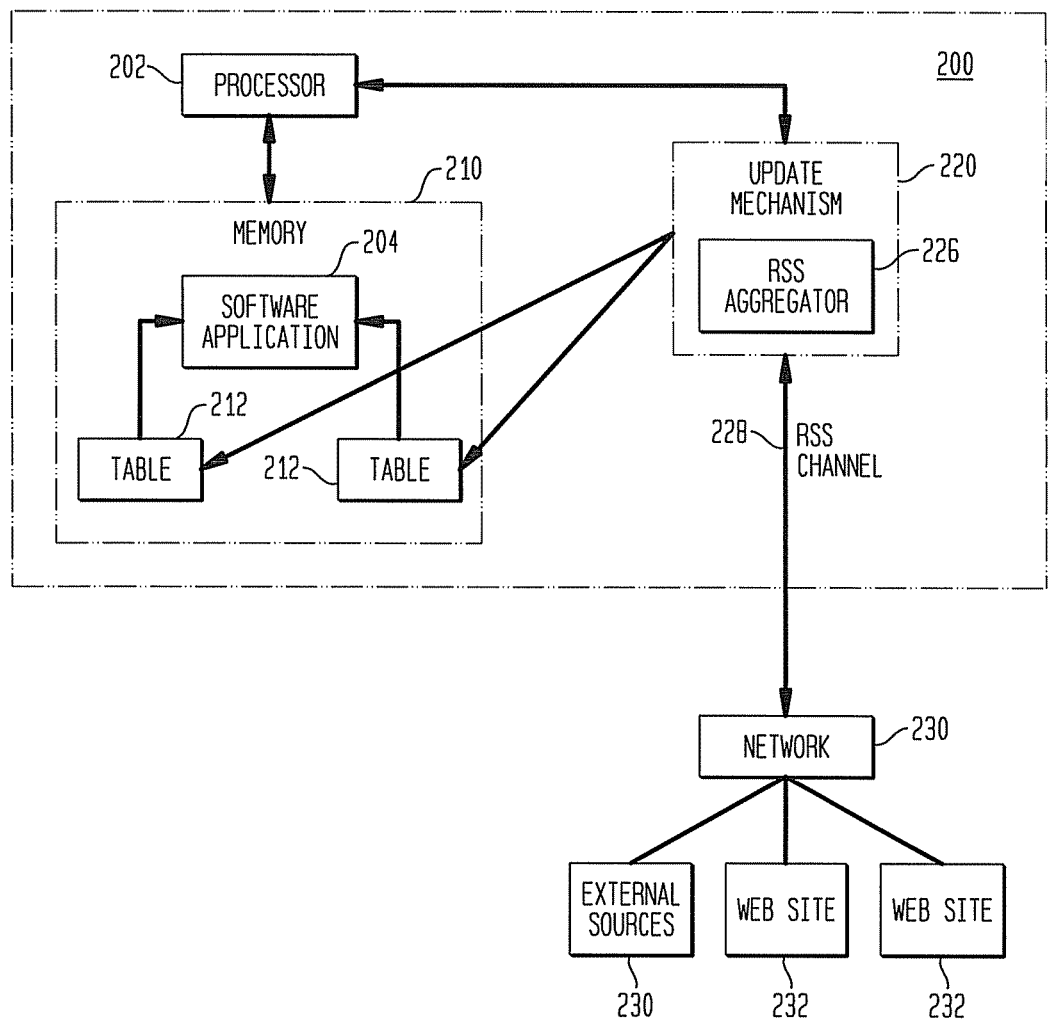
FIG. 2 is a block/flow diagram showing another system/method for automatically updating reference values for a software program in accordance with the present invention.

Referring to FIG. 2, a system 200 is illustratively depicted for automatically updating reference values in a database for use in a software application. A processing device or processor 202 is configured to execute a software application 204. The processing device 202 may be part of a computer or computer-like device. The software application 204 employs one or more dynamic data items 206 which change as a function of time, e.g., commodities prices, materials costs, currency exchange rate, labor rates, etc. The software application 204 may include any number of applications. In a particularly useful embodiment, the software application 204 includes a gas and oil program configured to estimate sizes and costs of gas and oil facilities.

A memory device 210 is configured to store at least one table 212 including the one or more dynamic data items 206 which change as a function of time. The memory device 210 may include a database or other storage element(s) to maintain tables. An update mechanism 220 is configured to check one or more external information sources 222 for current values of the one or more dynamic data items 206 and update the one or more dynamic data items 206 in the at least one table 212 such that, upon execution of the software application, a most recently updated value is employed for the one or more dynamic data items 206.

The update mechanism 220 may include a device that can interact with a network 230. The network 230 may include a telephone network, cable network, a satellite network, a local area network, the Internet, etc. The processing device 202 is preferably coupled to a network 230 so that the update mechanism 220 can establish a connection to an external source through the network 230. The update mechanism 220 may include a really simple syndication (RSS) aggregator 226 to establish an RSS channel 228 to gather updates. The one or more external information sources 230 may include web sites 232, and the RSS channel transmits updated data from the websites to the at least one table 212. The at least one table 212 includes reference values useful for the software program. In one embodiment, the tables 212 may include at least one of a marine vessel data rate table, equipment sizing and cost data table, a currency exchange rate table, and a labor rate table. Referring to FIG. 3, a method for automatically updating reference values in a software application is shown. In block 302, a software application is provided and initiated to employ one or more dynamic data items which change as a function of time. In block 304, at least one table including the one or more dynamic data items which change as a function of time is stored for reference values for the software program.

In block 306, one or more external information sources are checked for current values of the one or more dynamic data items. This may include periodic checks for updates or subscribing to updates so that the updates themselves trigger new values to be stored in the maintained tables.

In block 308, checking includes establishing a connection to an external source through a network. This may include establishing a really simple syndication (RSS) channel to gather updates. In block 310, the one or more dynamic data items in the at least one table are updated such that upon execution of the software application a most recently updated value is employed for the one or more dynamic data items.

The one or more external information sources may include web sites, subscriptions to data streams or any other external information source. Updating includes transmitting updated data from the websites to the at least one table using the RSS channel in block 312.

Having described preferred embodiments for system and method for updating software using updated data from external sources (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system with automatically updated reference values, comprising:
    a processing device configured to execute a software application to generate sizing and cost estimates, the software application employing one or more dynamic data items which change as a function of time;
    a memory device configured to store a plurality of tables, each table comprising data analogous to data included in a respective external information source from a plurality of external information sources and including the one or more dynamic data items which change as a function of time; and
    an update mechanism comprising a really simple syndication (RSS) aggregator configured to aggregate data from the plurality of external information sources and update the plurality of tables by:
        (i) checking each respective external information sources for current values of the one or more dynamic data items for each table via an RSS channel established to automatically download and aggregate updates for each table, wherein the check is triggered by the respective external information sources having new values, and
        (ii) updating the one or more dynamic data items in each table;
    wherein the processing device upon execution of the software application employs a most recently updated value for the one or more dynamic data items in a gas and oil program to estimate sizes and costs of gas and oil facilities.

2. The system as recited in claim 1, wherein the processing device is coupled to a network and the update mechanism establishes a connection to the respective external information sources through the network.

3. The system as recited in claim 1, wherein the plurality of external information sources include web sites that include data analogous to data included in the plurality of tables and the RSS channel transmits updated data from the websites to each respective table.

4. The system as recited in claim 1, wherein the gas and oil program configured to estimate sizes and costs of gas and oil facilities reevaluates break-even points based on new estimates resulting from the new values.

5. The system as recited in claim 1, wherein the plurality of tables include a marine vessel day rate data table, an equipment sizing and cost data table, a currency exchange rate table, and a labor rate table.

6. A method for automatically updating reference values, comprising:
 providing a software application to generate sizing and cost estimates employing one or more dynamic data items which change as a function of time;
 storing a plurality of tables, each table comprising data analogous to data included in a respective external information source from a plurality of external information sources and including the one or more dynamic data items which change as a function of time;
 aggregating data from the plurality of external information sources via a really simple syndication (RSS) aggregator and updating the plurality of tables by:
  checking each respective external information sources for current values of the one or more dynamic data items for each table via a really simple syndication (RSS) channel established to automatically download and aggregate the current values for each table, wherein the check is triggered by the respective external information sources having new values;
  updating the one or more dynamic data items in each table; and
 executing the software application by employing a most recently updated value for the one or more dynamic data items via a gas and oil program to estimate sizes and costs of gas and oil facilities.

7. The method as recited in claim 6, wherein checking includes establishing a connection to the respective external information sources through a network.

8. The method as recited in claim 6, wherein the plurality of external information sources include web sites that include data analogous to data included in the plurality of tables and the method further comprising transmitting updated data from the websites to each respective table using the RSS channel.

9. The method as recited in claim 6, wherein the gas and oil program configured to estimate sizes and costs of gas and oil facilities reevaluates break-even points based on new estimates resulting from the new values.

10. The method as recited in claim 6, wherein the plurality of tables include a marine vessel day rate data table, an equipment sizing and cost data table, a currency exchange rate table, and a labor rate table.

11. A non-transitory computer readable medium comprising a computer readable program, wherein the computer readable program when executed on a computer causes the computer to perform the steps of:
 initiating a software application to generate sizing and cost estimates employing one or more dynamic data items which change as a function of time;
 storing a plurality of tables, each table comprising data analogous to data included in a respective external information source from a plurality of external information sources and including the one or more dynamic data items which change as a function of time;
 aggregating data from the plurality of external information sources via a really simple syndication (RSS) aggregator and updating the plurality of tables by:
  checking each respective external information sources for current values of the one or more dynamic data items for each table via a really simple syndication (RSS) channel established to automatically download and aggregate the current values for each table, wherein the check is triggered by the respective external information sources having new values;
  updating the one or more dynamic data items each table; and
 executing the software application by employing a most recently updated value for the one or more dynamic data items via a gas and oil program to estimate sizes and costs of gas and oil facilities.

12. The non-transitory computer readable medium as recited in claim 11, wherein checking includes establishing a connection to the respective external information sources through a network.

13. The non-transitory computer readable medium as recited in claim 11, wherein the plurality of external information sources include web sites that include data analogous to data included in the plurality of tables and the method further comprising transmitting updated data from the websites to the each respective table using the RSS channel.

14. The non-transitory computer readable medium as recited in claim 11, wherein the gas and oil program configured to estimate sizes and costs of gas and oil facilities reevaluates break-even points based on new estimates resulting from the new values.

15. The non-transitory computer readable medium as recited in claim 11, wherein the plurality of tables include a marine vessel day rate data table, an equipment sizing and cost data table, a currency exchange rate table, and a labor rate table.

* * * * *